(12) United States Patent
Heu et al.

(10) Patent No.: US 8,462,444 B2
(45) Date of Patent: Jun. 11, 2013

(54) COMPACT ZOOM LENS

(75) Inventors: Min Heu, Seongnam-si (KR);
Young-woo Park, Changown-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 35 days.

(21) Appl. No.: 13/086,468

(22) Filed: Apr. 14, 2011

(65) Prior Publication Data

US 2012/0057246 A1    Mar. 8, 2012

(30) Foreign Application Priority Data

Sep. 7, 2010   (KR) .................. 10-2010-0087665

(51) Int. Cl.
*G02B 15/14*      (2006.01)

(52) U.S. Cl.
USPC .......................... 359/694; 359/686

(58) Field of Classification Search
USPC .............................. 359/694, 686
See application file for complete search history.

(56) References Cited

U.S. PATENT DOCUMENTS

2010/0321792 A1* 12/2010 Yamagami .................. 359/687

FOREIGN PATENT DOCUMENTS

| JP | 2004-354980 A | 12/2004 |
| JP | 2007-078834 A | 3/2007 |
| JP | 2007-256695 A | 10/2007 |
| JP | 2007-286601 A | 11/2007 |

* cited by examiner

*Primary Examiner* — James Jones
(74) *Attorney, Agent, or Firm* — Drinker Biddle & Reath LLP

(57) ABSTRACT

A zoom lens including, in a sequence from an object side to an image plane side: a first lens group having a negative refractive power; a second lens group having a positive refractive power; a third lens group having a negative refractive power; and a fourth lens group having a positive refractive power. During zooming from a wide angle position to a telephoto position, an interval between the first lens group and the second lens group decreases, an interval between the second lens group and the third lens group increases, and an interval between the third lens group and the fourth lens group decreases. When the location of an object changes from ∞ to a close location, the first lens group is moved toward the object to perform focusing.

12 Claims, 24 Drawing Sheets

COMPACT ZOOM LENS

CROSS-REFERENCE TO RELATED PATENT APPLICATION

This application claims the benefit of Korean Patent Application No. 10-2010-0087665, filed on Sep. 7, 2010, in the Korean Intellectual Property Office, the disclosure of which is incorporated herein in its entirety by reference.

BACKGROUND

The invention relates to zoom lenses suitable for image pickup devices that are used in ultra-compact digital cameras, ultra-compact digital video cameras, portable telephones, personal digital assistants (PDAs), and the like.

Imaging optical apparatuses, such as digital cameras or digital camcorders that use image pickup devices, such as charge coupled devices (CCDs) or complementary metal-oxide semiconductors (CMOSs), are currently used widely. Accordingly, zoom lenses that have high performance and are compact and lightweight are required.

As for recent interchangeable lens cameras allowing users to interchange lenses with lenses suitable for a desired viewing angle and desired brightness according to their photographing purposes, demand for cameras having high optical performance and a portable compact size has increased.

In wide-angle zoom lenses having a viewing angle of 70° or greater and a magnification of around 2.5×, a 4-group zoom lens having four lens groups, respectively having negative, positive, negative, positive refractive power, is usually used.

Zoom lenses in which a lens group having a negative refractive power is located in the front have a relatively short minimum object distance (MOD) and thus relatively easily perform view angle-widening. In addition, the zoom lenses can relatively increase a back focal length. Thus, the zoom lenses are widely used as wide-angle zoom lenses. Since such a zoom lens has a positive refractive power from first and second lens groups and a negative refractive power from third and fourth lens groups at a telephoto position, the entire optical system of the zoom lens can have a telephoto structure. Therefore, the zoom lens can easily perform long focusing at the telephoto position.

However, it is difficult to provide a design that satisfies optical performance and miniaturization at the same time. For example, a zoom lens designed by using 12 lenses to achieve aberration correction has been proposed. However, the number of lenses used is too large to achieve a compact structure, and the costs for manufacturing the zoom lens are high. A zoom lens optical system having 10 lenses, including a plastic aspherical lens, and providing magnification of 3× has also been proposed. However, since a plastic lens degrades in optical performance due to double refraction and degrades in optical performance according to a change in temperature, humid, or the like, it is difficult to secure high optical performance that is required by high-pixel digital cameras.

SUMMARY

Embodiments of the invention provide a compact wide-angle zoom lens that provides high optical performance and is formed of a small number of lenses.

According to an embodiment of the invention, there is provided a zoom lens including, in a sequence from an object side to an image plane side: a first lens group having a negative refractive power; a second lens group having a positive refractive power; a third lens group having a negative refractive power; and a fourth lens group having a positive refractive power. During zooming from a wide angle position to a telephoto position, an interval between the first lens group and the second lens group decreases, an interval between the second lens group and the third lens group increases, and an interval between the third lens group and the fourth lens group decreases. When the location of an object changes from ∞ to a close location, the first lens group is moved toward the object to perform focusing. The zoom lens satisfies the following expression:

$$\frac{L_W}{\sqrt{f_W \cdot f_T}} \le 3.0$$

where $L_W$, $f_W$, and $f_T$ denote an optical overall length at the wide angle position, an overall focal length at the wide angle position, and an overall focal length at the telephoto position, respectively.

The zoom lens may satisfy the following expression:

$$\frac{L_T}{\sqrt{f_W \cdot f_T}} \le 3.0$$

where $L_T$, $f_W$, and $f_T$ denote an optical overall length at the telephoto position, the overall focal length at the wide angle position, and the overall focal length at the telephoto position, respectively.

The zoom lens may satisfy the following expression:

$$0.55 \le \frac{f_{II}}{\sqrt{f_W \cdot f_T}} \le 0.75$$

where $f_{II}$, $f_W$, and $f_T$ denote a focal length of the second lens group, the overall focal length at the wide angle position, and the overall focal length at the telephoto position, respectively.

The zoom lens may satisfy the following expression:

$$0.35 \le \frac{m_{II(W)}}{m_{II(T)}} \le 0.5$$

where $m_{II(W)}$ and $m_{II(T)}$ denote a paraxial lateral magnification of the second lens group at the wide angle position and a paraxial lateral magnification of the second lens group at the telephoto position, respectively.

The second and fourth lens groups move in the same trajectory during zooming.

The first lens group may include, in a sequence from the object side, a negative meniscus lens that is convex toward the object; a negative biconcave lens; and a positive meniscus lens that is convex toward the object. The positive meniscus lens is formed of a material having a refractive index greater than 1.9.

The second lens group may include a doublet lens which is a combination of a positive lens and a negative lens.

The third lens group may include a single negative lens. The negative lens of the third lens group may be formed of a material having an Abbe's number greater than 80.

The fourth lens group may include a single positive lens and a single negative lens. The positive lens of the fourth lens group may include at least one aspherical surface.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
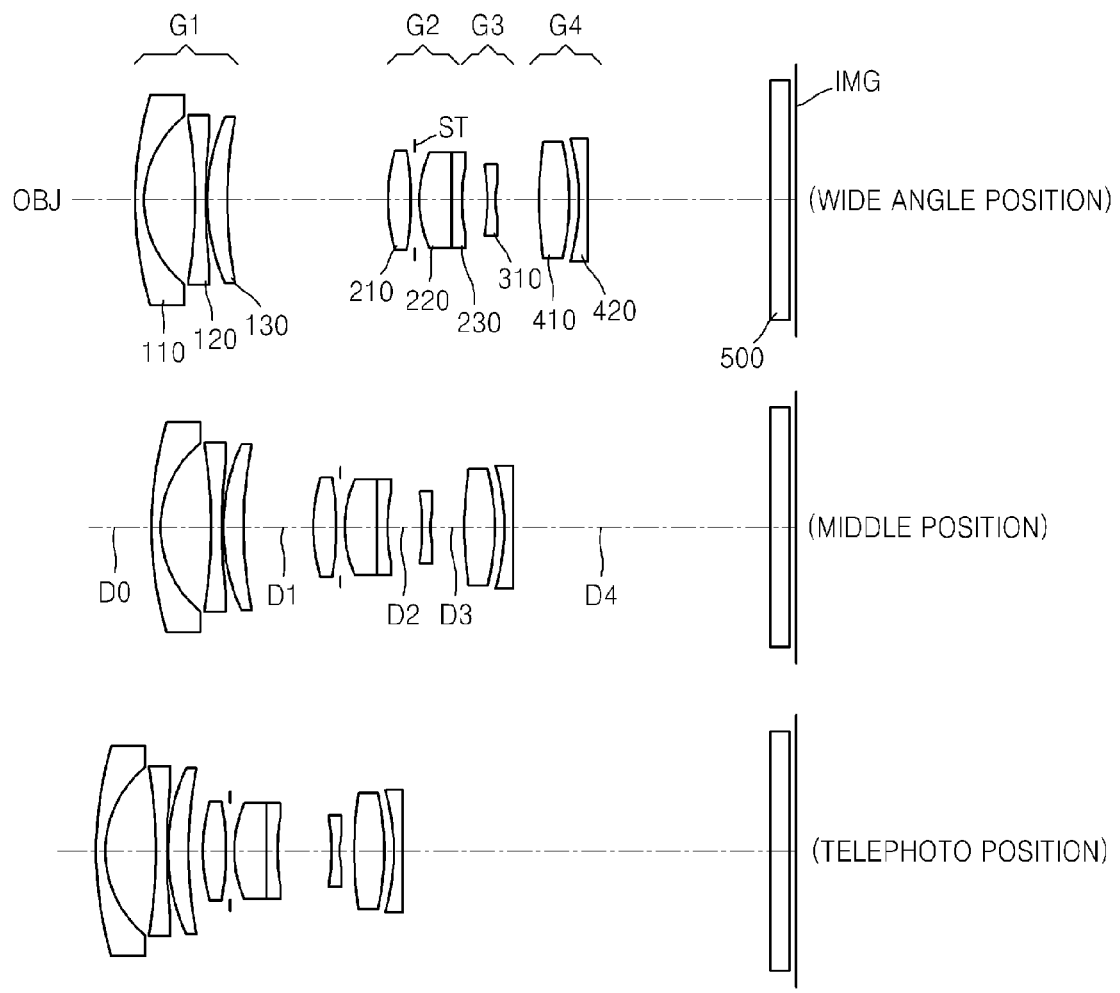
FIG. 1 is a collection of schematic side views illustrating optical arrangements of a zoom lens at a wide angle position, at a middle position, and at a telephoto position, according to an embodiment of the invention.

The invention will now be described more fully with reference to the accompanying drawings, in which exemplary embodiments of the invention are shown. In the drawings, like reference numerals denote like elements, and the sizes or thicknesses of elements may be exaggerated for clarity.

FIGS. 1, 3, 5, 7, 9 and 11 illustrate optical arrangements of zoom lenses according to embodiments 1 through 6 of the invention.

Referring to FIGS. 1, 3, 5, 7, 9 and 11, the zoom lenses include a first lens group G1 having a negative refractive power, a second lens group G2 having a positive refractive power, a third lens group G3 having a negative refractive power, and a fourth lens group G4 having a positive refractive power that are sequentially arranged in the direction from an object OBJ to an image IMG. When zooming is performed from a wide angle position to a telephoto position, all of the first, second, third, and fourth lens groups G1, G2, G3, and G4 move—specifically, they move so that a distance between the first and second lens groups G1 and G2 decreases, a distance between the second and third lens groups G2 and G3 increases, and a distance between the third and fourth lens groups G3 and G4 decreases. When the location of the object OBJ changes from ∞ to a close location, the first lens group G1 moves toward the object OBJ and performs focusing. In addition, the second and fourth lens groups G2 and G4 are designed to move in the same trajectory when they perform zooming, and thus the zoom lenses may have a mechanically simple structure and may be manufactured with few errors. An infrared filter 500 is installed between the fourth lens group G4 and an image plane IMG. A stop ST is disposed to be engaged with the second lens group G2.

A structure of each lens group will now be described in greater detail.

The first lens group G1 includes a first lens 110 having a negative refractive power, a second lens 120 having a negative refractive power, and a third lens 130 having a positive refractive power that are sequentially arranged from the object side to the image side. The first lens 110 may have a meniscus shape that is convex toward the object OBJ. The second lens 120 may have a biconcave shape. The third lens 130 may have a meniscus shape that is convex toward the object OBJ. When the third lens 130, which is a positive lens, is formed of a high refractive and high-dispersion material, the overall length of the entire optical system may be reduced, and lateral chromatic aberration may be effectively corrected. To achieve these advantages, in embodiments 1 through 6, the third lens 130 is formed of a material having a refractive index of 1.9 or greater. At least one of the surfaces of the first and second lenses 110 and 120, which are negative lenses, may be aspherical. In this case, astigmatism and distortion may be effectively corrected.

The second lens group G2 includes a fourth lens 210 having a positive refractive power, a fifth lens 220 having a positive refractive power, and a sixth lens 230 having a negative refractive power. The fifth and sixth lenses 220 and 230 may be formed as a doublet lens in order to correct chromatic aberration. The second lens group G2 may further include the stop ST, and the stop ST may be disposed between the fourth and fifth lenses 210 and 220 or closest to an image plane side of the second lens group G2. The above-described arrangement of the stop ST may allow the distance between the first and second lens groups G1 and G2 to be short at the telephoto position, compared with an arrangement in which the stop ST is disposed closest to an object side of the second group G2, and thus is advantageous in increasing magnification. As such, the stop ST may be disposed within the second lens group G2, that is, between lenses of the second lens group G2, or may be disposed nearest to the image plane side of the second lens group G2. In the former case, it is easy to secure a high aperture ratio of a telephoto position but it is difficult to install the stop ST. However, in the latter case, it is easy to install the stop ST but it is difficult to secure a high aperture ratio of a telephoto position. Accordingly, it is necessary to determine a location of the stop ST by analyzing the overall specification and manufacturing technique of the optical system.

The third lens group G3 includes a seventh lens 310 having a negative refractive power. The third lens group G3 includes only one lens in order to form an optical system by using a small number of lenses. When the seventh lens 310 is formed of a low-dispersion material, a small change in chromatic aberration may occur during zooming. In embodiments 1 through 6, a material having an Abbe's number of 80 or greater is used to form the seventh lens 310.

The fourth lens group G4 includes an eighth lens 410 having a positive refractive power and a ninth lens 420 having a negative refractive power. To effectively correct coma and astigmatism, at least one surface of the eighth lens 410, which is a positive lens, is made aspherical.

The zoom lenses according to embodiments 1 through 6 may satisfy Expression (1):

$$\frac{L_W}{\sqrt{f_W \cdot f_T}} \leq 3.0 \quad (1)$$

where $L_W$, $f_W$, and $f_T$ denote an optical overall length at the wide angle position, an overall focal length at the wide angle position, and an overall focal length at the telephoto position, respectively.

The zoom lenses according to embodiments 1 through 6 may also satisfy Expression (2):

$$\frac{L_T}{\sqrt{f_W \cdot f_T}} \leq 3.0 \quad (2)$$

where $L_T$, $f_W$, and $f_T$ denote an optical overall length at the telephoto position, the overall focal length at the wide angle position, and the overall focal length at the telephoto position, respectively.

The conditions of Expressions (1) and (2) define a ratio of the overall length of the optical system at the wide angle position to a zoom magnification and a ratio of the overall length of the optical system at the telephoto angle position to the zoom magnification, respectively. In each of the conditions of Expressions (1) and (2), when the ratio exceeds an upper limit, it is difficult to construct a compact optical system.

The zoom lenses according to embodiments 1 through 6 may also satisfy Expression (3):

$$0.55 \leq \frac{f_{II}}{\sqrt{f_W \cdot f_T}} \leq 0.75 \quad (3)$$

where $f_{II}$, $f_W$, and $f_T$ denote a focal length of the second lens group G2, the overall focal length at the wide angle position, and the overall focal length at the telephoto position, respectively.

The condition of Expression (3) defines a ratio of the focal length of the second lens group G2 to a zoom magnification. When the ratio exceeds an upper limit, the refractive power of the second lens group G2 is excessive, and thus it is difficult to effectively correct coma at the wide angle position and spherical aberration at the telephoto position. On the other hand, when the ratio is less than the upper limit, the amount of movement of the second lens group G2 during zooming is increased, and thus it is complicated and difficult to mechanically embody the movement of the second lens group G2.

The zoom lenses according to embodiments 1 through 6 may also satisfy Expression (4):

$$0.35 \leq \frac{m_{II(W)}}{m_{II(T)}} \leq 0.5 \quad (4)$$

where $m_{II(W)}$ and $m_{II(T)}$ denote a paraxial lateral magnification of the second lens group G2 at the wide angle position and a paraxial lateral magnification of the second lens group G2 at the telephoto position, respectively.

The condition of Expression (4) defines a ratio of the lateral magnification of the second lens group G2 at the wide angle position to the lateral magnification of the second lens group G2 at the telephoto position, which is for achieve a zoom magnification of about 2.5×. Within the range of the condition of Expression (4), load on the zooming of the second lens group G2 is optimized, and thus an aberration change depending on zooming is small and making the optical system compact is easy.

Detailed lens data of each lens group will now be described according to embodiments.

The term "aspherical (ASP)" described in embodiments 1 through 6 of the invention is defined as follows:

$$x = \frac{c'y^2}{1 + \sqrt{1 - (K+1)c'^2 h^2}} + Ah^4 + Bh^6 + Ch^8 + Dh^{10}$$

where x denotes a distance from an vertex of a lens along an optical axis, y denotes a distance from the vertex of the lens in a direction perpendicular to the optical axis, K denotes a conic constant, A, B, C, and D denote aspherical coefficients, and c' denotes a reciprocal (1/R) of the radius of curvature of the vertex of the lens.

In the lens data, STO denotes a stop and ASP denotes an aspherical surface. EFL denotes an overall focal length of the entire zoom lens, Fno denotes the F number, 2ω denotes a viewing angle, and D1, D2, D3, and D4 are variable distances at the wide angle position, the middle position, and the telephoto position.

Embodiment 1

FIG. 1 illustrates optical arrangements of a zoom lens according to embodiment 1 of the invention. Lens data is as follows.

TABLE 1 f; 20.52~31.55~48.52 Fno; 3.58~4.47~5.85 2ω; 74.3°~49.0°~32.5°

|  | RADIUS | THICKNESS | Nd | Vd |
|---|---|---|---|---|
| OBJ: | ∞ | D0 | | |
| 1: | 43.50000 | 1.200000 | 1.74330 | 49.22 |
| 2: | 13.18900 | 5.920000 | | |
| 3: | −52.93200 | 1.200000 | 1.65844 | 50.85 |
| 4: | 100.00000 | 0.220000 | | |
| 5: | 28.26000 | 2.360000 | 1.92286 | 20.88 |
| 6: | 64.81700 | D1 | | |
| 7: | 23.09400 | 2.550000 | 1.48749 | 70.44 |
| 8: | −31.89000 | 0.510000 | | |
| STO: | ∞ | 0.510000 | | |
| 10: | 15.38600 | 3.720000 | 1.63854 | 55.45 |
| 11: | −183.00000 | 1.200000 | 1.84666 | 23.78 |
| 12: | 23.71700 | D2 | | |
| 13: | −26.00000 | 0.940000 | 1.49700 | 81.61 |
| 14: | 106.90000 | D3 | | |
| 15: | 34.00000 | 3.500000 | 1.51424 | 63.88 |
| 16: | −24.90000 | 1.170000 | | |
| ASP: | K: 0.000000 A: 0.951937E−04 B: 0.244053E−06 | | | |
| | C: 0.192516E−08 D: 0.000000E+00 | | | |
| 17: | −27.82700 | 1.100000 | 1.51680 | 64.20 |
| 18: | −183.00000 | D4 | | |
| 19: | ∞ | 2.000000 | 1.51680 | 64.20 |
| 20: | ∞ | 1.000000 | | |
| IMG: | ∞ | | | |

| | Wide (Inf) | Middle (Inf) | Tele (Inf) | Wide (close) | Middle (close) | Tele (close) |
|---|---|---|---|---|---|---|
| D0 | ∞ | ∞ | ∞ | 190.00000 | 190.00000 | 190.00000 |
| D1 | 18.52235 | 8.07158 | 1.50189 | 21.55631 | 11.10554 | 4.53584 |
| D2 | 2.96086 | 4.31211 | 6.27206 | 2.96086 | 4.31211 | 6.27206 |
| D3 | 4.96302 | 3.61178 | 1.65182 | 4.96302 | 3.61178 | 1.65182 |
| D4 | 21.12195 | 29.78063 | 42.45510 | 21.12195 | 29.78063 | 42.45510 |

Figure 2A:
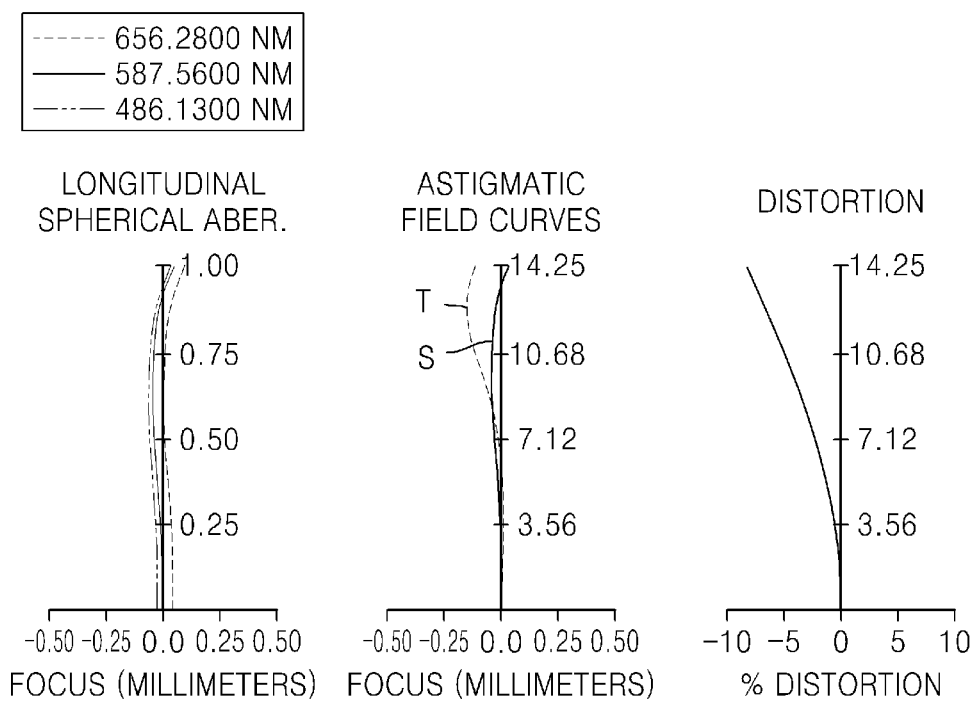
FIGS. 2A, 2B, and 2C are graphs that each illustrate longitudinal spherical aberration, astigmatic field curves, and distortion of the zoom lens illustrated in FIG. 1, at a wide angle position, at a middle position, and at a telephoto position.
Figure 2B:
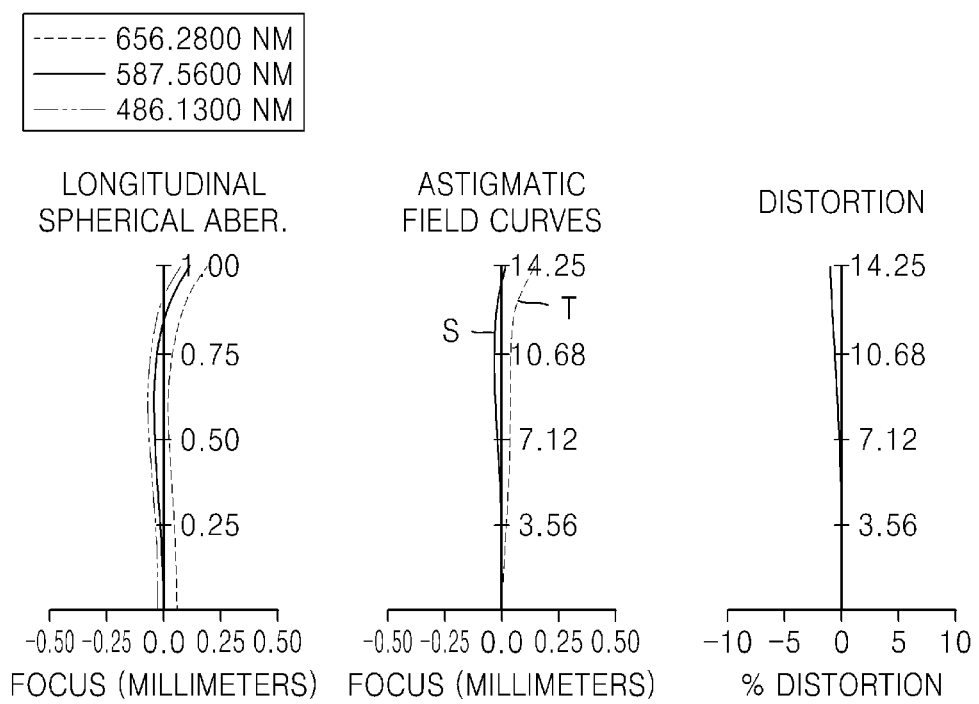
Figure 2C:
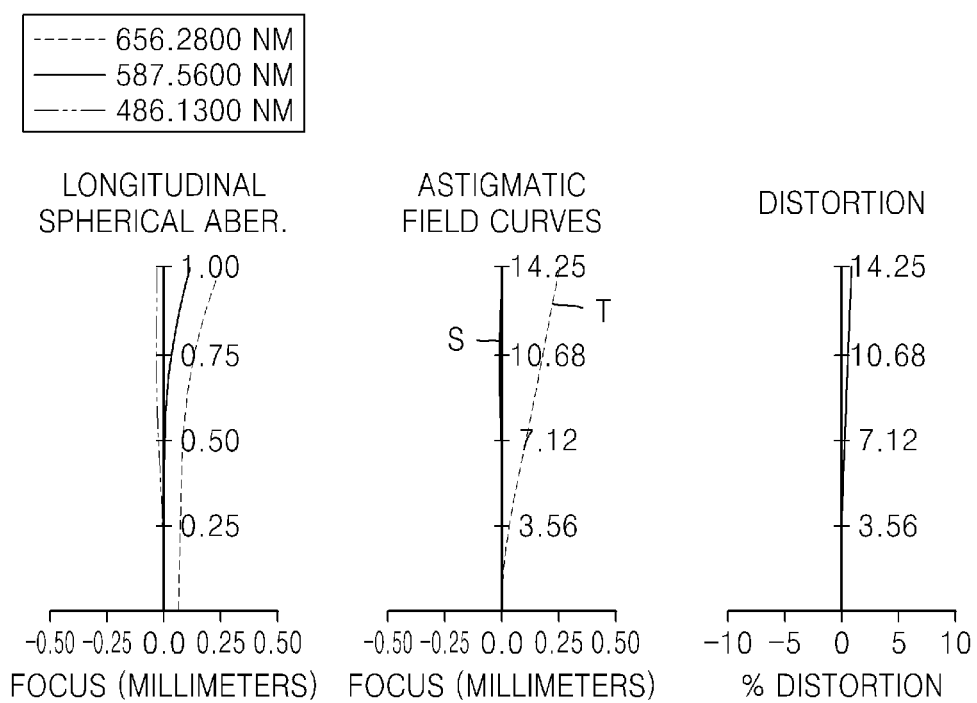

FIGS. 2A, 2B, and 2C each illustrate longitudinal spherical aberration, astigmatic field curves, and distortion of the zoom lens according to embodiment 1, at a wide angle position, at a middle position, and at a telephoto position. The longitudinal spherical aberration includes a line C having a wavelength of 656.28 nm, a line d having a wavelength of 587.56 nm, and a line F having a wavelength of 486.13 nm. In the astigmatic field curves, T and S denote a curve on a tangential surface and a curve on a sagittal surface, respectively.

Embodiment 2

Figure 3:
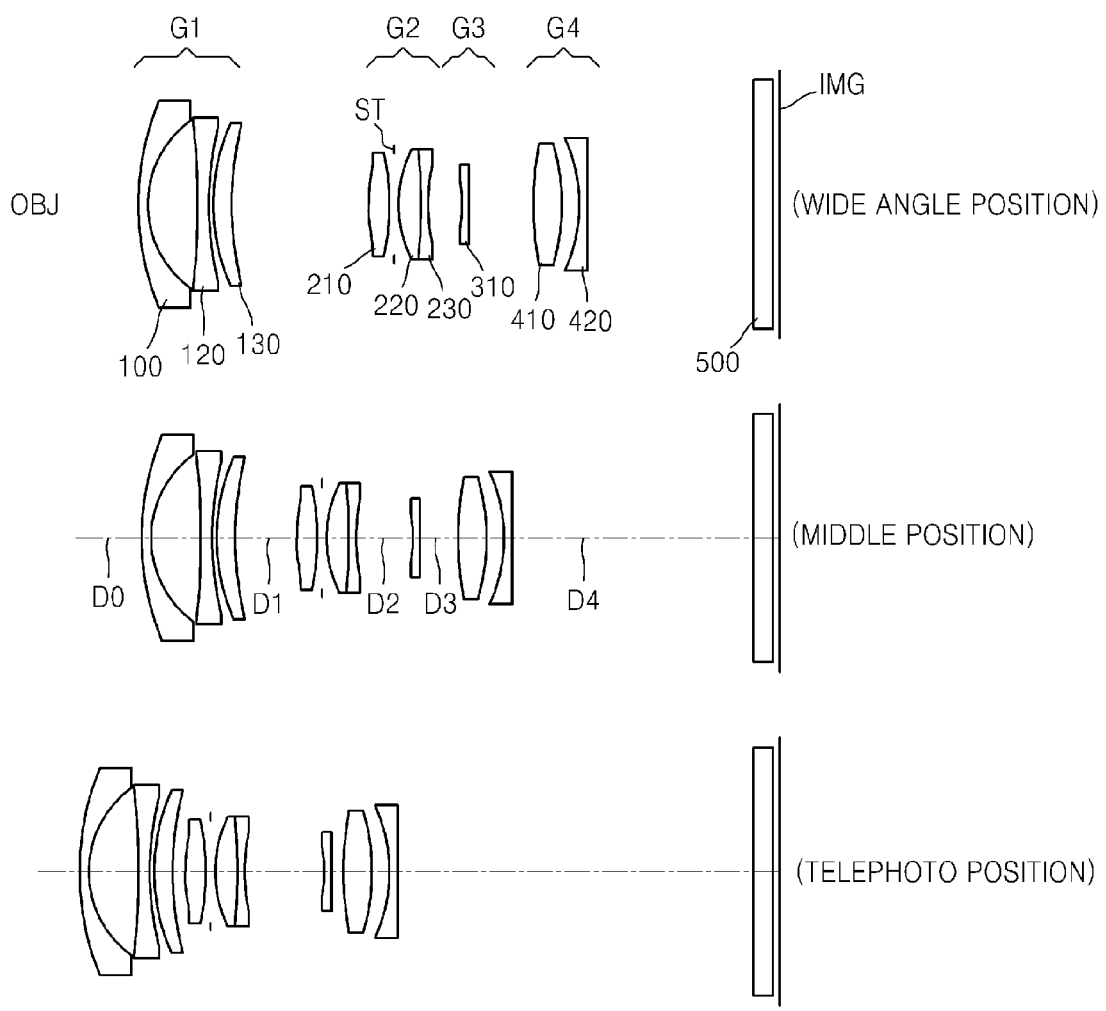
FIG. 3 is a collection of schematic side views illustrating optical arrangements of a zoom lens at a wide angle position, at a middle position, and at a telephoto position, according to another embodiment of the invention.

FIG. 3 illustrates optical arrangements of a zoom lens according to embodiment 2 of the invention. Lens data is as follows.

TABLE 2 f; 20.63~31.64~48.53 Fno; 3.55~4.43~5.83 2ω; 72.1°~48.6°~32.4°

|  | RADIUS | THICKNESS | Nd | Vd |
|---|---|---|---|---|
| OBJ: | ∞ | D0 | | |
| 1: | 29.60100 | 1.200000 | 1.69680 | 55.46 |
| 2: | 12.01700 | 5.710000 | | |
| 3: | 77.66200 | 1.200000 | 1.74330 | 49.22 |
| 4: | 40.09800 | 0.390000 | | |
| 5: | 22.87600 | 2.190000 | 1.92286 | 20.88 |
| 6: | 43.70100 | D1 | | |
| 7: | 37.02400 | 2.330000 | 1.48749 | 70.44 |
| 8: | 26.27000 | 0.510000 | | |
| STO: | ∞ | 0.510000 | | |
| 10: | 13.66800 | 2.490000 | 1.63854 | 55.45 |
| 11: | 162.40300 | 0.830000 | 1.84666 | 23.78 |
| 12: | 28.05100 | D2 | | |
| 13: | 40.38800 | 0.840000 | 1.49700 | 81.61 |
| 14: | 104.19800 | D3 | | |
| 15: | 37.90300 | 3.150000 | 1.51424 | 63.88 |
| 16: | 21.21500 | 2.010000 | | |
| ASP: | K: 0.000000 A: 0.869204E−04 B: 0.242781E−06 | | | |
| | C: 0.278456E−08 D: 0.000000E+00 | | | |
| 17: | 18.20700 | 1.100000 | 1.51680 | 64.20 |
| 18: | 159.36800 | D4 | | |

TABLE 2-continued

| f; 20.63~31.64~48.53 Fno; 3.55~4.43~5.83 2ω; 72.1°~48.6°~32.4° | | | | |
|---|---|---|---|---|
| 19: | ∞ | 2.000000 | 1.51680 | 64.20 |
| 20: | ∞ | 1.000000 | | |
| IMG: | ∞ | | | |

| | Wide (Inf) | Middle (Inf) | Tele (Inf) | Wide (close) | Middle (close) | Tele (close) |
|---|---|---|---|---|---|---|
| D0 | ∞ | ∞ | ∞ | 190.00000 | 190.00000 | 190.00000 |
| D1 | 15.50945 | 6.82217 | 1.42702 | 17.92860 | 9.24132 | 3.84617 |
| D2 | 3.76564 | 6.26996 | 9.02459 | 3.76564 | 6.26996 | 9.02459 |
| D3 | 7.34077 | 4.48907 | 1.45000 | 7.34077 | 4.48907 | 1.45000 |
| D4 | 18.66678 | 27.20540 | 40.05648 | 18.66678 | 27.20540 | 40.05648 |

Figure 4A:
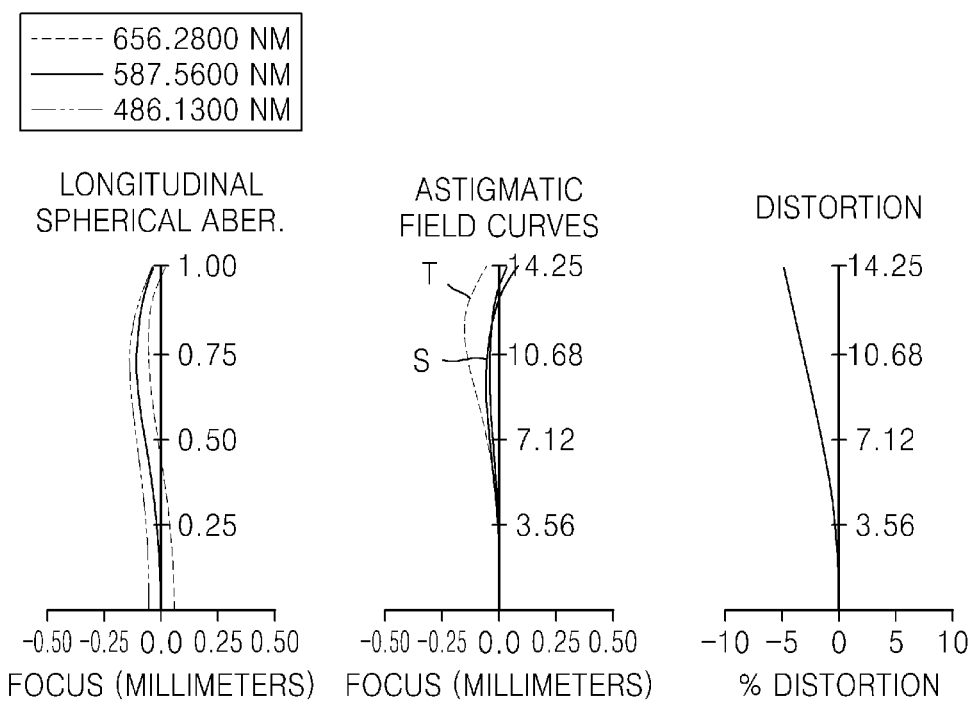
FIGS. 4A, 4B, and 4C are graphs that each illustrate longitudinal spherical aberration, astigmatic field curves, and distortion of the zoom lens illustrated in FIG. 3, at a wide angle position, at a middle position, and at a telephoto position.
Figure 4B:
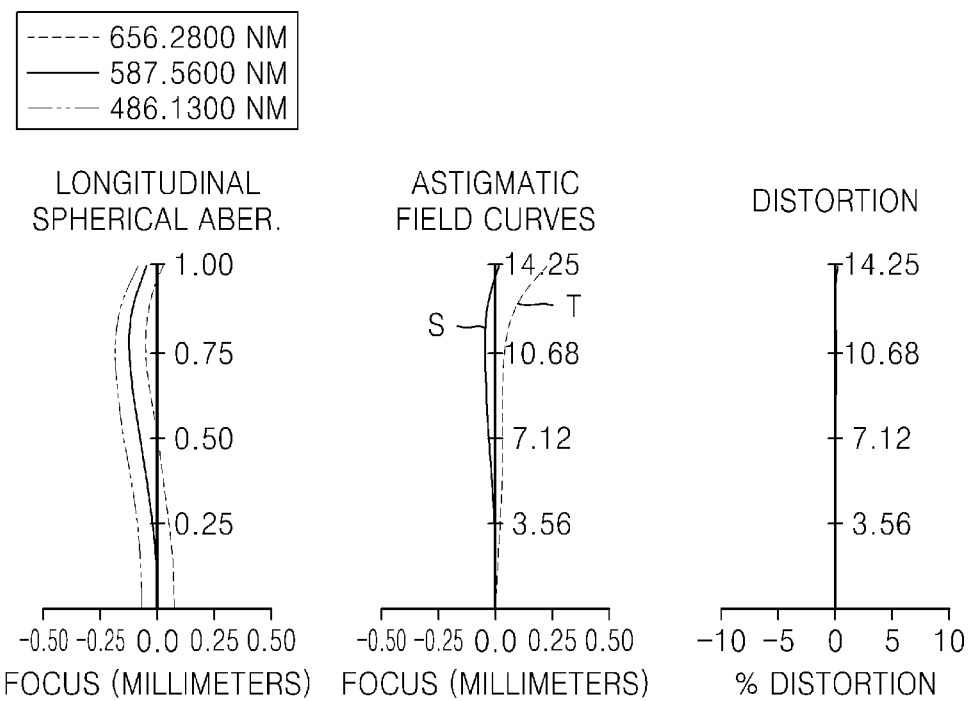
Figure 4C:
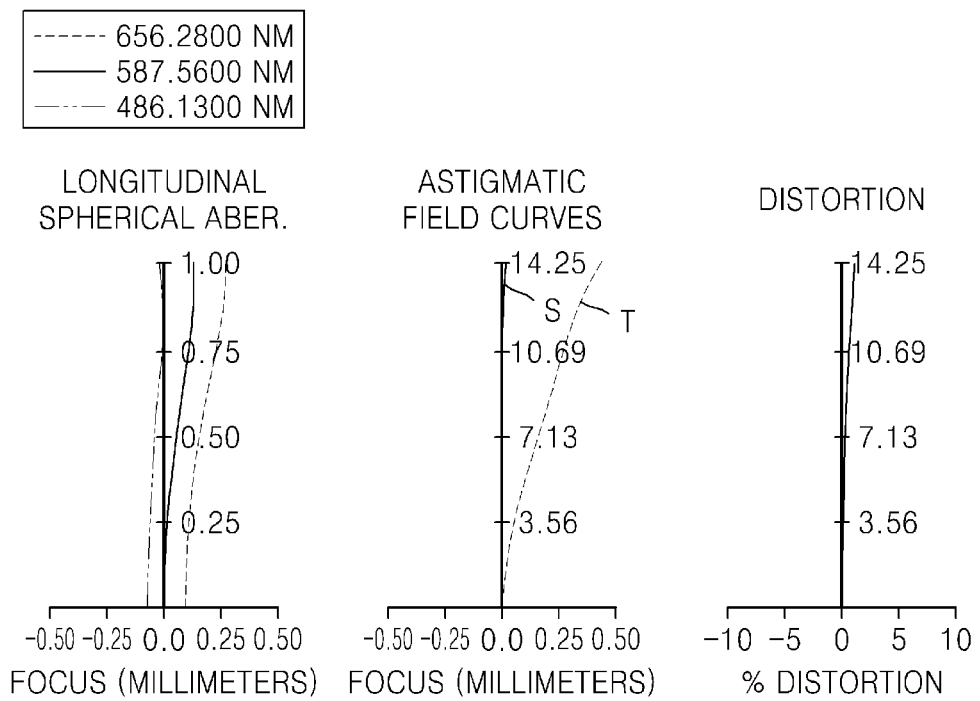

FIGS. 4A, 4B, and 4C each illustrate longitudinal spherical aberration, astigmatic field curves, and distortion of the zoom lens according to embodiment 2, at a wide angle position, at a middle position, and at a telephoto position.

Embodiment 3

Figure 5:
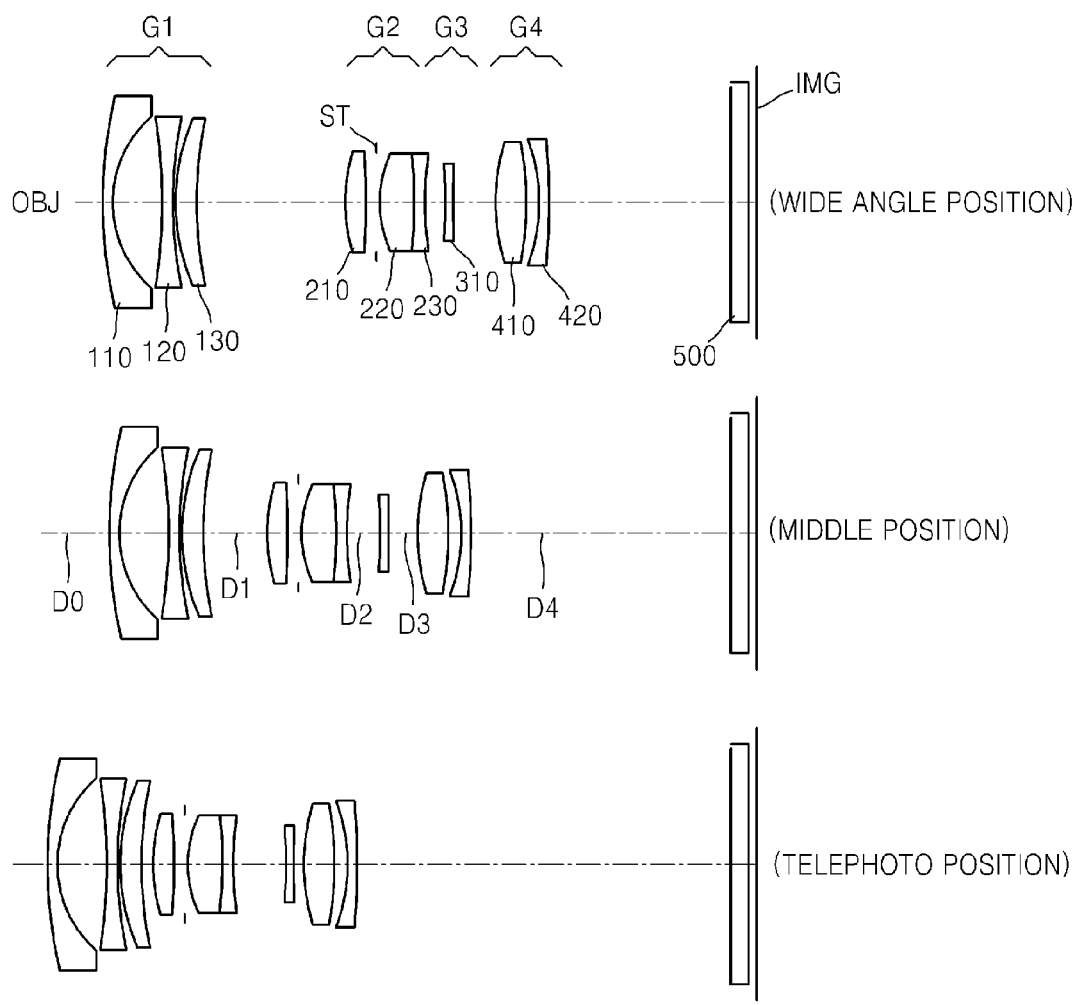
FIG. 5 is a collection of schematic side views illustrating optical arrangements of a zoom lens at a wide angle position, at a middle position, and at a telephoto position, according to another embodiment of the invention.

FIG. 5 illustrates optical arrangements of a zoom lens according to embodiment 3 of the invention. Lens data in Embodiment 3 is as follows.

TABLE 3

| f; 20.62~31.63~48.52 Fno; 3.57~4.47~5.88 2ω; 74.0°~49.2°~32.6° | | | | |
|---|---|---|---|---|
| | RADIUS | THICKNESS | Nd | Vd |
| OBJ: | ∞ | D0 | | |
| 1: | 47.87200 | 1.200000 | 1.74330 | 49.22 |
| 2: | 13.27800 | 5.690000 | | |
| 3: | −76.89900 | 1.200000 | 1.52470 | 56.24 |
| 4: | 41.98600 | 0.410000 | | |
| ASP: | K: 0.000000 A: −.268622E−05 B: 0.124533E−07 | | | |
| | C: −.400652E−09 D: 0.000000E+00 | | | |
| 5: | 25.23800 | 2.400000 | 1.92286 | 20.88 |
| 6: | 50.46600 | D1 | | |
| 7: | 20.20000 | 2.480000 | 1.48749 | 70.44 |
| 8: | −44.10200 | 1.100000 | | |
| STO: | ∞ | 0.510000 | | |
| 10: | 16.09700 | 3.720000 | 1.63854 | 55.45 |
| 11: | −71.17200 | 1.200000 | 1.84666 | 23.78 |
| 12: | 29.01700 | D2 | | |
| 13: | −42.24100 | 0.700000 | 1.49700 | 81.61 |
| 14: | 53.85100 | D3 | | |
| 15: | 28.68900 | 3.500000 | 1.52470 | 56.24 |
| 16: | −25.15600 | 1.490000 | | |
| ASP: | K: 0.000000 A: 0.985382E−04 B: 0.217360E−06 C: | | | |
| | 0.288136E−08 D: 0.000000E+00 | | | |
| 17: | −19.95200 | 1.100000 | 1.58913 | 61.25 |
| 18: | −72.06500 | D4 | | |
| 19: | ∞ | 2.000000 | 1.51680 | 64.20 |
| 20: | ∞ | 1.000000 | | |
| IMG: | ∞ | | | |

| | Wide (Inf) | Middle (Inf) | Tele (Inf) | Wide (close) | Middle (close) | Tele (close) |
|---|---|---|---|---|---|---|
| D0 | ∞ | ∞ | ∞ | 190.00000 | 190.00000 | 190.00000 |
| D1 | 16.83370 | 7.30837 | 1.29865 | 19.61625 | 10.09092 | 4.08120 |
| D2 | 2.48847 | 3.95412 | 6.00847 | 2.48847 | 3.95412 | 6.00847 |
| D3 | 5.02005 | 3.55440 | 1.50005 | 5.02005 | 3.55440 | 1.50005 |
| D4 | 20.78755 | 29.56902 | 42.47601 | 20.78755 | 29.56902 | 42.47601 |

Figure 6A:
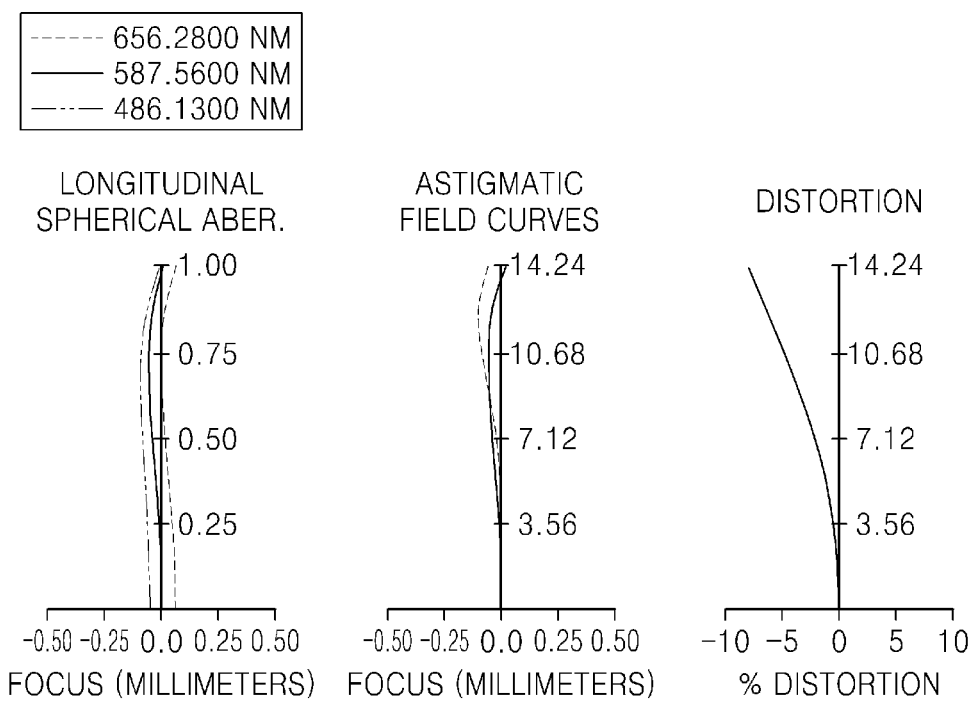
FIGS. 6A, 6B, and 6C are graphs that each illustrate longitudinal spherical aberration, astigmatic field curves, and distortion of the zoom lens illustrated in FIG. 5, at a wide angle position, at a middle position, and at a telephoto position.
Figure 6B:
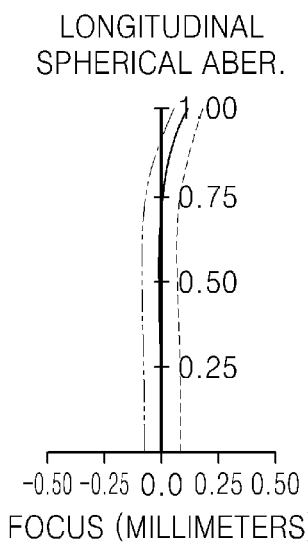
Figure 6B:
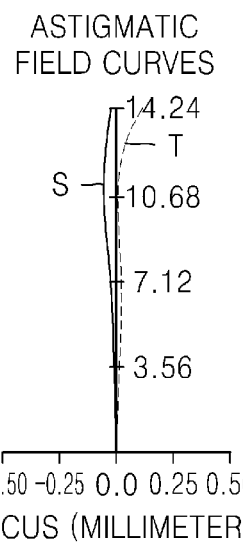
Figure 6B:
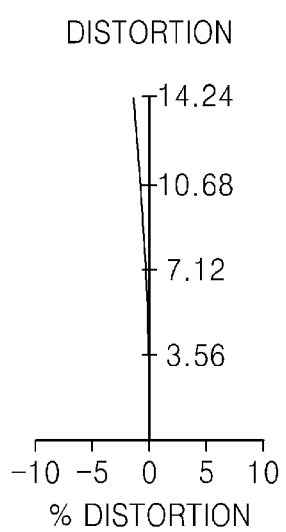
Figure 6C:
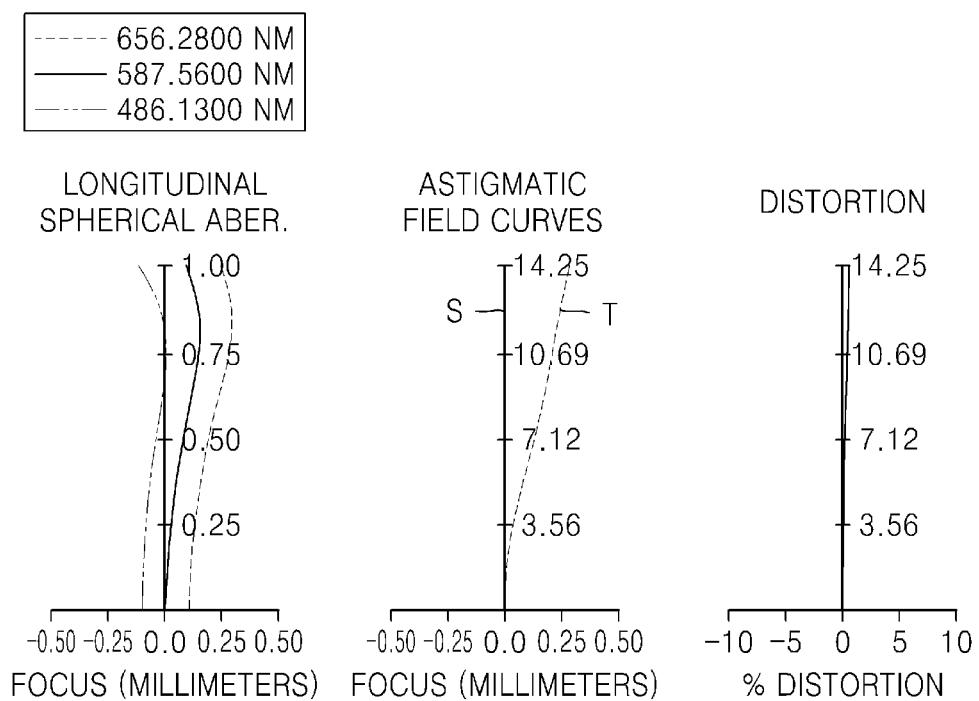

FIGS. 6A, 6B, and 6C each illustrate longitudinal spherical aberration, astigmatic field curves, and distortion of the zoom lens according to embodiment 3, at a wide angle position, at a middle position, and at a telephoto position.

Embodiment 4

Figure 7:
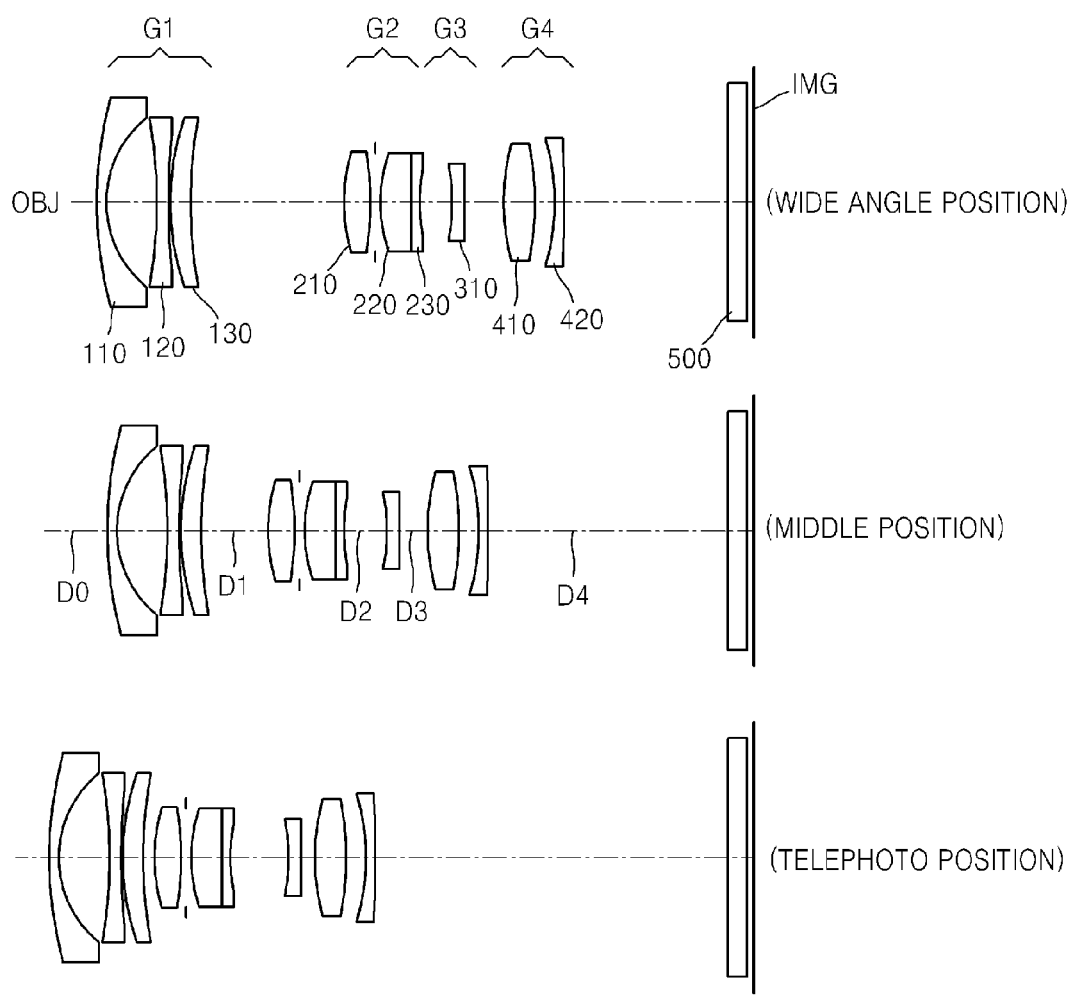
FIG. 7 is a collection of schematic side views illustrating optical arrangements of a zoom lens at a wide angle position, at a middle position, and at a telephoto position, according to another embodiment of the invention.

FIG. 7 illustrates optical arrangements of a zoom lens according to embodiment 4 of the invention. Lens data in Embodiment 4 is as follows.

TABLE 4 f; 20.62~31.63~48.53 Fno; 3.56~4.45~5.85 2ω; 74.1°~49.0°~32.5°

| | RADIUS | THICKNESS | Nd | Vd |
|---|---|---|---|---|
| OBJ: | ∞ | D0 | | |
| 1: | 46.07600 | 1.200000 | 1.74330 | 49.22 |
| 2: | 13.26300 | 5.930000 | | |
| 3: | −52.60600 | 1.200000 | 1.65844 | 50.85 |
| 4: | 106.37500 | 0.200000 | | |
| 5: | 28.45500 | 2.370000 | 1.92286 | 20.88 |
| 6: | 64.85500 | D1 | | |
| 7: | 21.21700 | 2.990000 | 1.48749 | 70.44 |
| 8: | −35.55500 | 0.670000 | | |
| STO: | ∞ | 0.510000 | | |
| 10: | 15.96400 | 3.720000 | 1.63854 | 55.45 |
| 11: | −113.11500 | 0.800000 | 1.84666 | 23.78 |
| 12: | 26.44900 | D2 | | |
| 13: | −24.29500 | 1.500000 | 1.49700 | 81.61 |
| 14: | 114.96600 | D3 | | |
| 15: | 27.87000 | 3.500000 | 1.51424 | 63.88 |
| 16: | −26.66100 | 2.270000 | | |
| ASP: | K: 0.000000 A: 0.983826E−04 B: 0.199127E−06 | | | |
| | C: 0.160199E−08 D: 0.000000E+00 | | | |
| 17: | −24.78100 | 1.100000 | 1.51680 | 64.20 |
| 18: | −183.00000 | D4 | | |
| 19: | ∞ | 2.000000 | 1.51680 | 64.20 |
| 20: | ∞ | 1.000000 | | |
| IMG: | ∞ | | | |

| | Wide (Inf) | Middle (Inf) | Tele (Inf) | Wide (close) | Middle (close) | Tele (close) |
|---|---|---|---|---|---|---|
| D0 | ∞ | ∞ | ∞ | 190 | 190 | 190 |
| D1 | 17.539 | 7.58 | 1.303 | 20.49 | 10.531 | 4.254 |
| D2 | 3.738 | 4.968 | 6.574 | 3.738 | 4.968 | 6.574 |
| D3 | 4.486 | 3.256 | 1.65 | 4.486 | 3.256 | 1.65 |
| D4 | 18.952 | 27.625 | 40.51 | 18.952 | 27.625 | 40.51 |

Figure 8A:
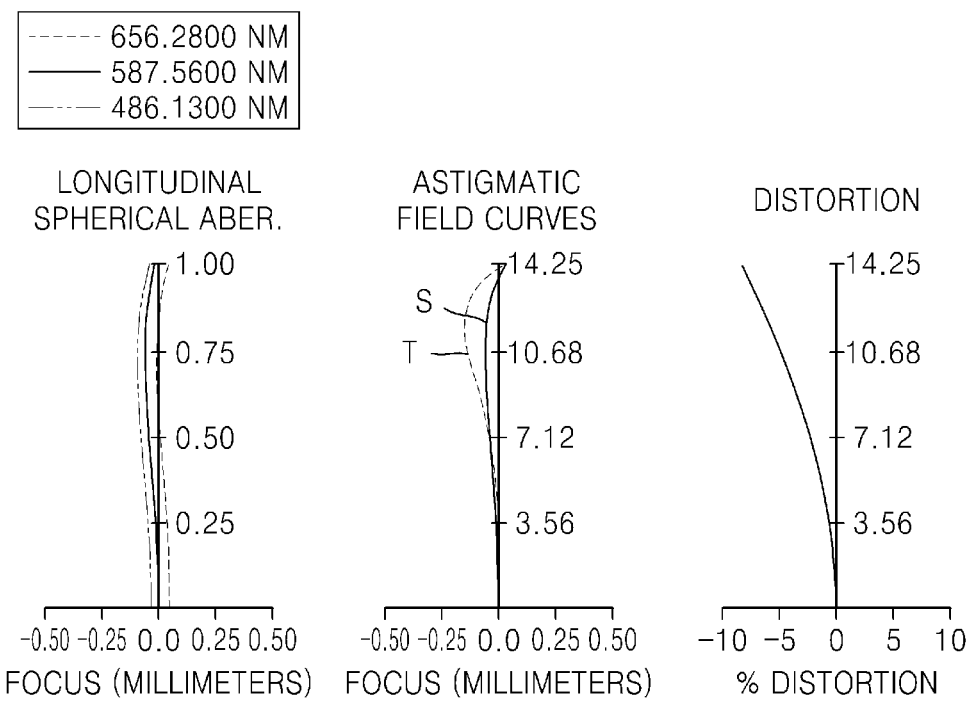
FIGS. 8A, 8B, and 8C are graphs that each illustrate longitudinal spherical aberration, astigmatic field curves, and distortion of the zoom lens illustrated in FIG. 7, at a wide angle position, at a middle position, and at a telephoto position.
Figure 8B:
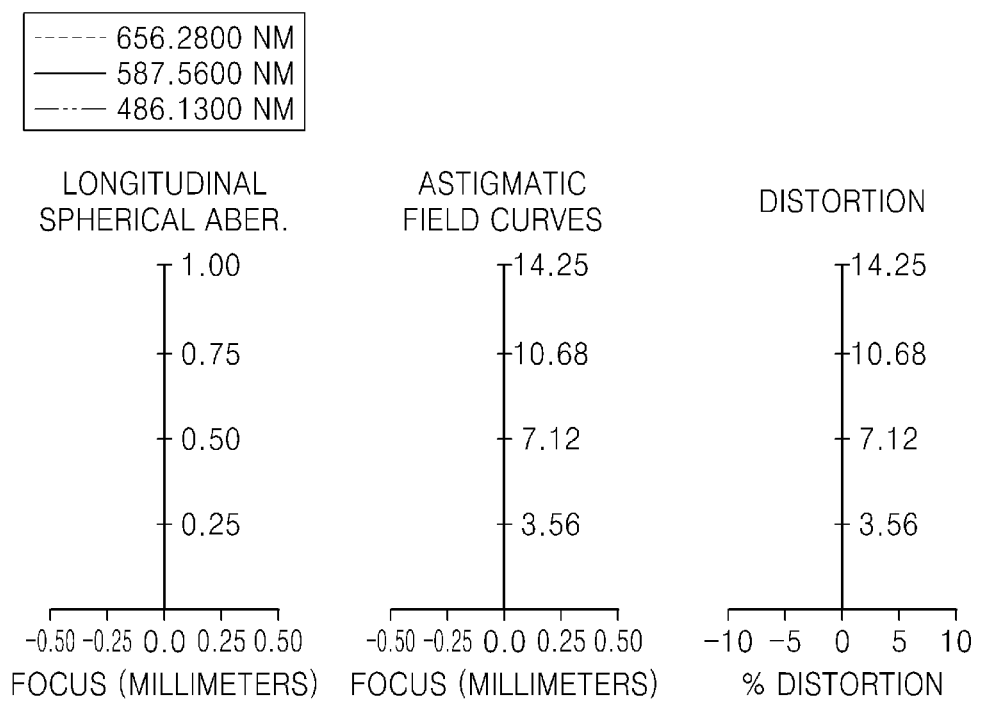
Figure 8C:
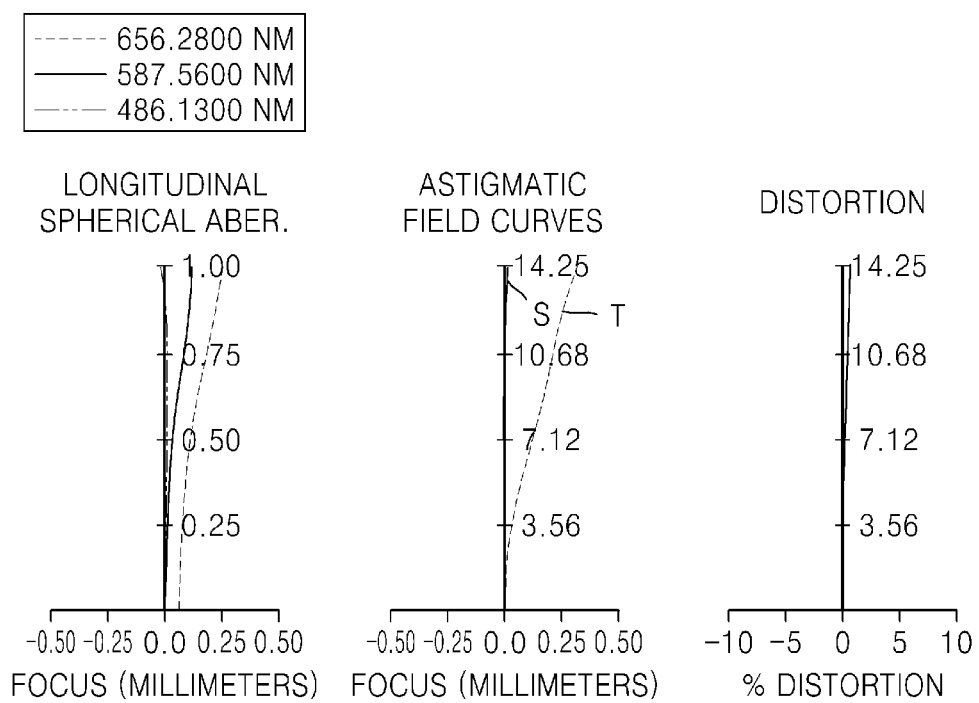

FIGS. 8A, 8B, and 8C each illustrate longitudinal spherical aberration, astigmatic field curves, and distortion of the zoom lens according to embodiment 4, at a wide angle position, at a middle position, and at a telephoto position.

Embodiment 5

Figure 9:
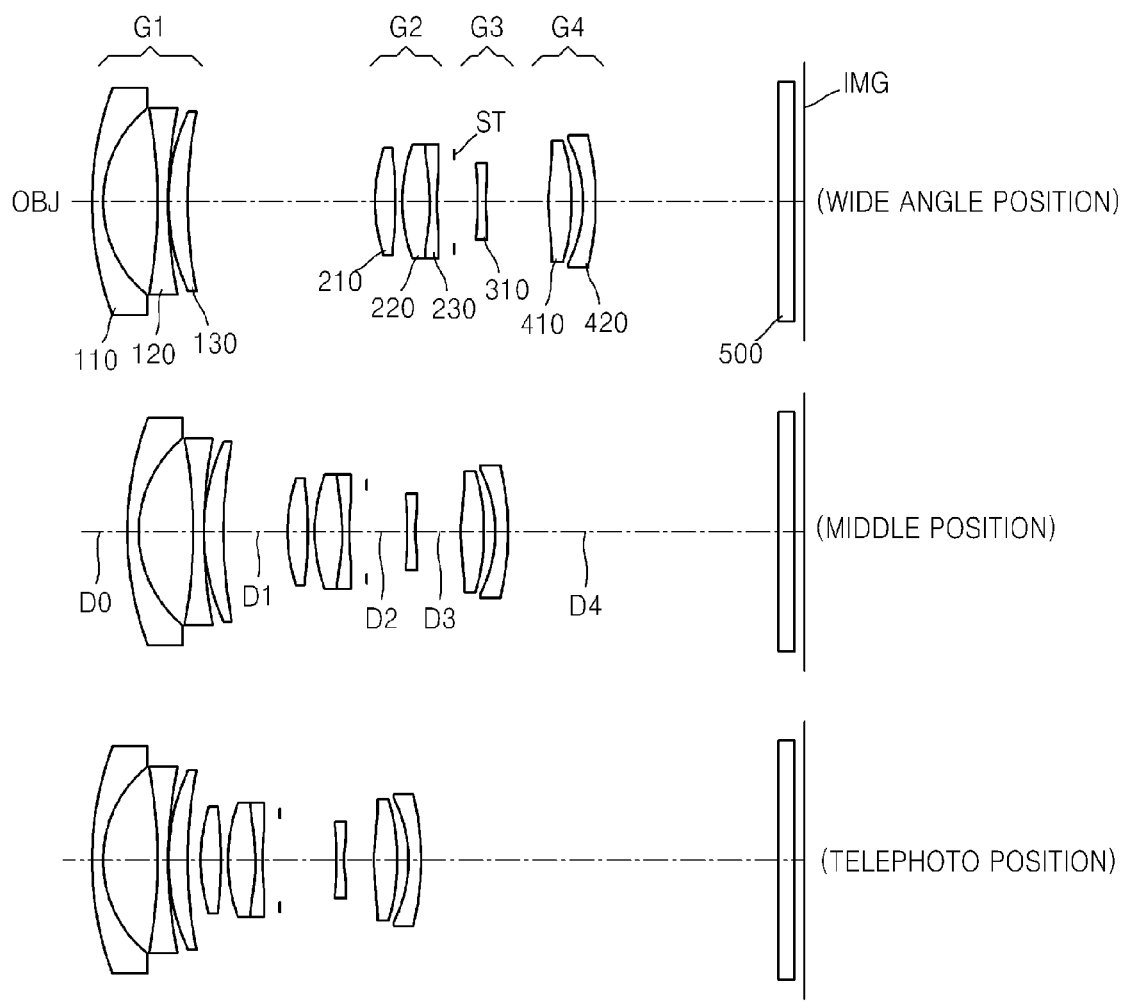
FIG. 9 is a collection of schematic side views illustrating optical arrangements of a zoom lens at a wide angle position, at a middle position, and at a telephoto position, according to another embodiment of the invention.

FIG. 9 illustrates optical arrangements of a zoom lens according to embodiment 5 of the invention. Lens data in Embodiment 5 is as follows.

TABLE 5 f; 20.60~34.00~48.50 Fno; 3.57~4.62~5.82 2ω; 74.2°~45.8°~32.5°

| | RADIUS | THICKNESS | Nd | Vd |
|---|---|---|---|---|
| OBJ: | ∞ | D0 | | |
| 1: | 38.81500 | 1.220000 | 1.74330 | 49.2 |
| 2: | 14.07100 | 6.330000 | | |
| 3: | −59.57400 | 1.100000 | 1.56883 | 56.0 |
| 4: | 59.57400 | 0.100000 | | |
| 5: | 26.66500 | 2.100000 | 1.92286 | 20.9 |
| 6: | 51.01600 | D1 | | |
| 7: | 22.77200 | 2.350000 | 1.48749 | 70.4 |
| 8: | −35.81300 | 0.910000 | | |
| 9: | 19.83600 | 3.000000 | 1.70154 | 41.1 |
| 10: | −31.52900 | 0.650000 | 1.84666 | 23.8 |
| 11: | 41.10100 | 2.100000 | | |
| STO: | ∞ | D2 | | |
| 13: | −36.80100 | 0.900000 | 1.49700 | 81.6 |
| 14: | 36.80100 | D3 | | |
| 15: | 50.38200 | 2.800000 | 1.58913 | 61.1 |
| 16: | −20.28900 | 1.160000 | | |
| ASP | K: 3.200000 A: 8.325631E−05 B: 2.758356E−07 | | | |
| | C: 6.011031E−09 D: 0.000000E+00 | | | |
| 17: | −15.49500 | 1.400000 | 1.58144 | 40.9 |
| 18: | −32.67800 | D4 | | |

TABLE 5-continued f; 20.60~34.00~48.50 Fno; 3.57~4.62~5.82 2ω; 74.2°~45.8°~32.5°

| | | | | |
|---|---|---|---|---|
| 19: | ∞ | 2.000000 | 1.51680 | 64.20 |
| 20: | ∞ | 1.000000 | | |
| IMG: | ∞ | | | |

| | Wide (Inf) | Middle (Inf) | Tele (Inf) | Wide (close) | Middle (close) | Tele (close) |
|---|---|---|---|---|---|---|
| D0 | ∞ | ∞ | ∞ | 200 | 200 | 200 |
| D1 | 21.471 | 7.605 | 1.5 | 24.827 | 10.962 | 4.856 |
| D2 | 2.745 | 4.607 | 6.604 | 2.745 | 4.607 | 6.604 |
| D3 | 7.153 | 5.291 | 3.293 | 7.153 | 5.291 | 3.293 |
| D4 | 20.834 | 30.759 | 40.73 | 20.834 | 30.759 | 40.73 |

Figure 10A:
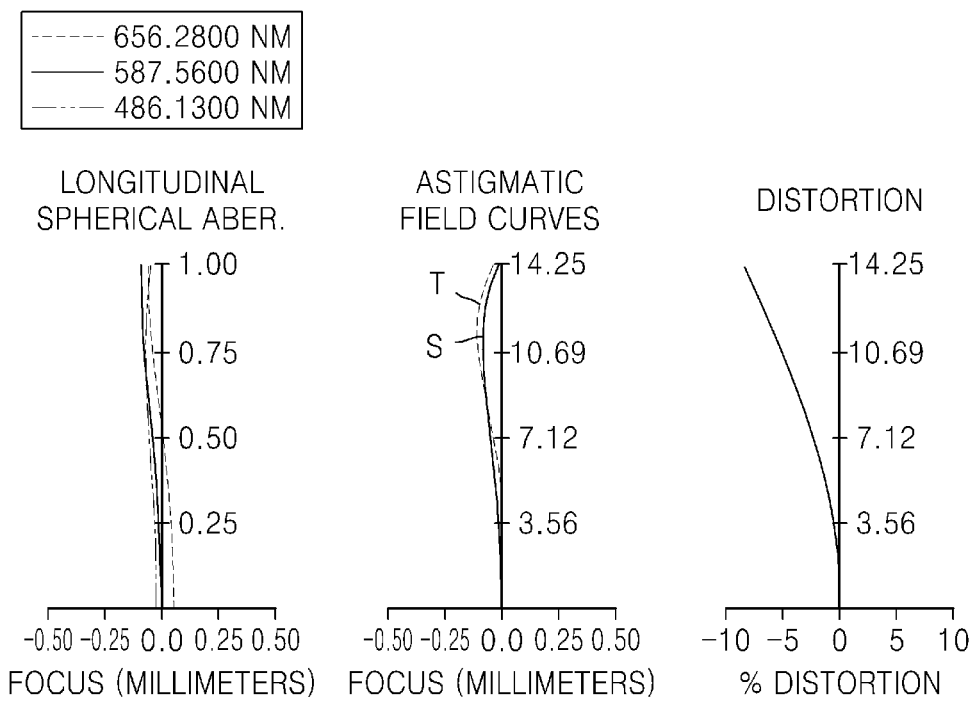
FIGS. 10A, 10B, and 10C are graphs that each illustrate longitudinal spherical aberration, astigmatic field curves, and distortion of the zoom lens illustrated in FIG. 9, at a wide angle position, at a middle position, and at a telephoto position.
Figure 10B:
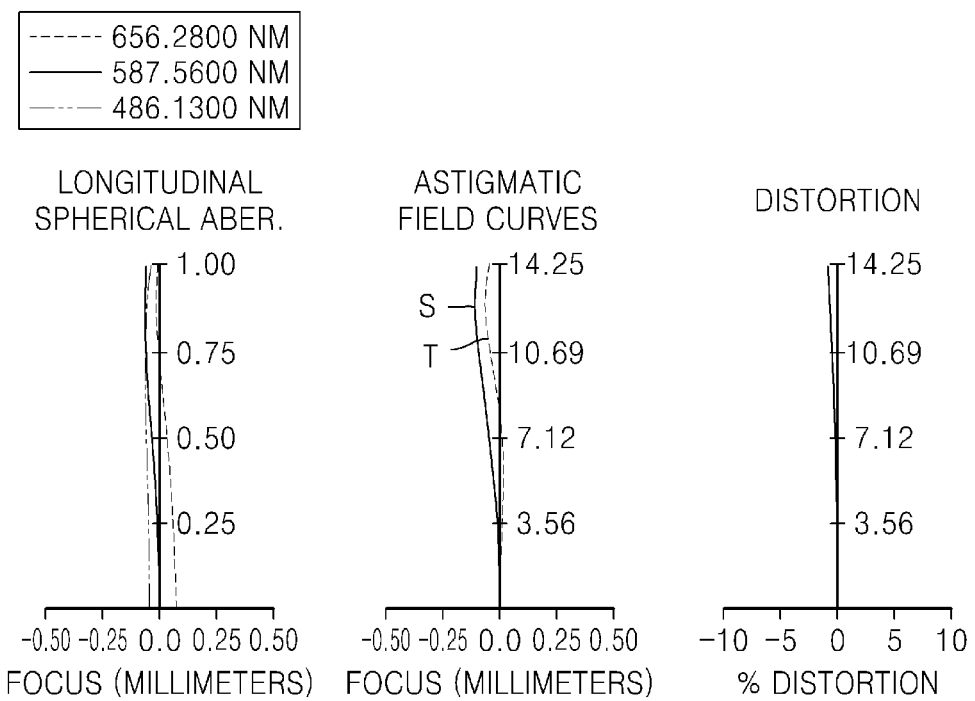
Figure 10C:
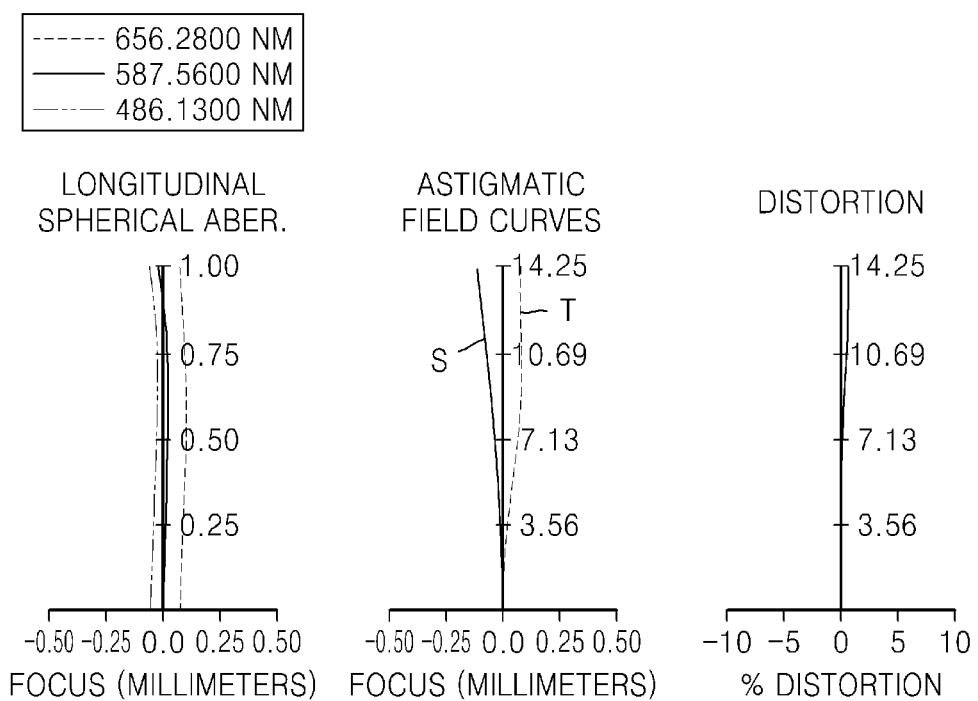

FIGS. 10A, 10B, and 10C each illustrate longitudinal spherical aberration, astigmatic field curves, and distortion of the zoom lens according to embodiment 5, at a wide angle position, at a middle position, and at a telephoto position.

Embodiment 6

Figure 11:
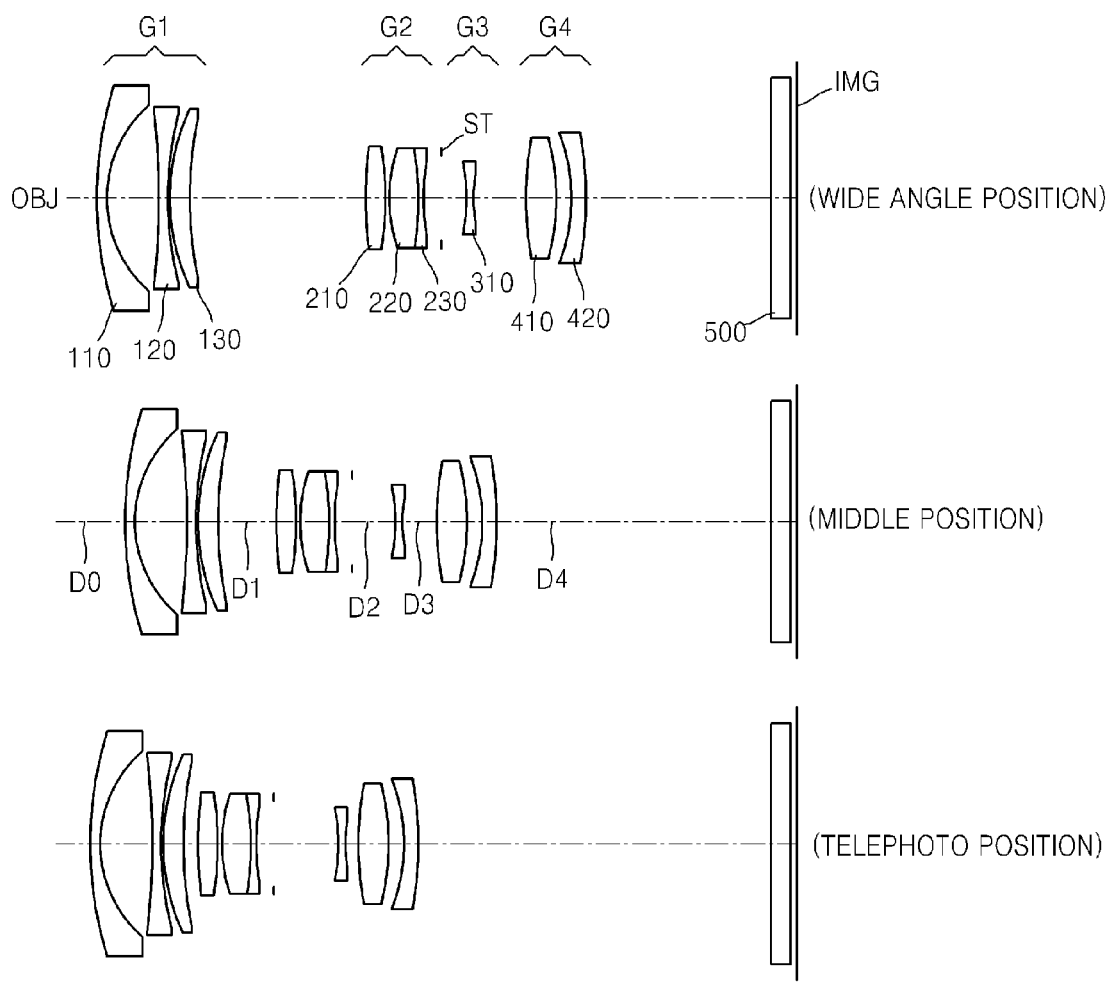
FIG. 11 is a collection of schematic side views illustrating optical arrangements of a zoom lens at a wide angle position, at a middle position, and at a telephoto position, according to another embodiment of the invention.

FIG. 11 illustrates optical arrangements of a zoom lens according to embodiment 6 of the invention. Lens data in Embodiment 6 is as follows.

TABLE 6 f; 20.59~34.48~48.49 Fno; 3.54~4.60~5.78 2ω; 74.2°~45.2°~32.5°

| | RADIUS | THICKNESS | Nd | Vd |
|---|---|---|---|---|
| OBJ: | ∞ | D0 | | |
| 1: | 43.96300 | 1.200000 | 1.74330 | 49.2 |
| 2: | 14.41400 | 5.920000 | | |
| 3: | −113.82900 | 1.200000 | 1.65844 | 50.9 |
| 4: | 44.93000 | 0.220000 | | |
| 5: | 25.48500 | 2.360000 | 1.92286 | 20.9 |
| 6: | 52.04400 | D1 | | |
| 7: | 31.39100 | 2.390000 | 1.48749 | 70.4 |
| 8: | −29.96200 | 0.400000 | | |
| 9: | 16.36000 | 3.360000 | 1.70154 | 41.1 |
| 10: | −43.72000 | 0.670000 | 1.84666 | 23.8 |
| 11: | 27.11700 | 2.100000 | | |
| STO: | ∞ | D2 | | |
| 13: | −34.06200 | 0.900000 | 1.49700 | 81.6 |
| 14: | 34.06200 | D3 | | |
| 15: | 40.49800 | 3.500000 | 1.58913 | 61.1 |
| 16: | −20.64600 | 1.750000 | | |
| ASP | K: 1.736655 A: 7.058302E−05 B: 2.075560E−07 | | | |
| | C: 1.363424E−009 D: 0.000000E+00 | | | |
| 17: | −21.82900 | 1.600000 | 1.60342 | 38.0 |
| 18: | −50.88700 | D4 | | |
| 19: | ∞ | 2.000000 | 1.51680 | 64.20 |
| 20: | ∞ | 1.000000 | | |
| IMG: | ∞ | | | |

| | Wide (Inf) | Middle (Inf) | Tele (Inf) | Wide (close) | Middle (close) | Tele (close) |
|---|---|---|---|---|---|---|
| D0 | ∞ | ∞ | ∞ | 200 | 200 | 200 |
| D1 | 20.389 | 6.808 | 1.502 | 23.688 | 10.107 | 4.801 |
| D2 | 2.892 | 5.023 | 7.45 | 2.892 | 5.023 | 7.45 |
| D3 | 6.157 | 4.027 | 1.6 | 6.157 | 4.027 | 1.6 |
| D4 | 21.677 | 31.994 | 41.152 | 21.677 | 31.994 | 41.152 |

Figure 12A:
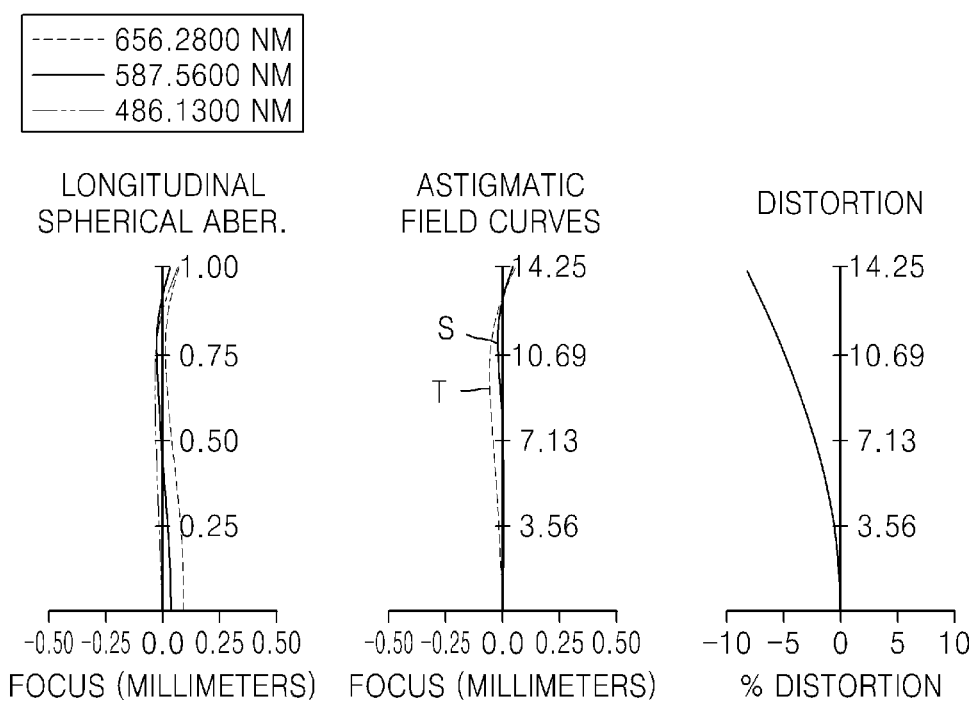
FIGS. 12A, 12B, and 12C are graphs that each illustrate longitudinal spherical aberration, astigmatic field curves, and distortion of the zoom lens illustrated in FIG. 11, at a wide angle position, at a middle position, and at a telephoto position.
Figure 12B:
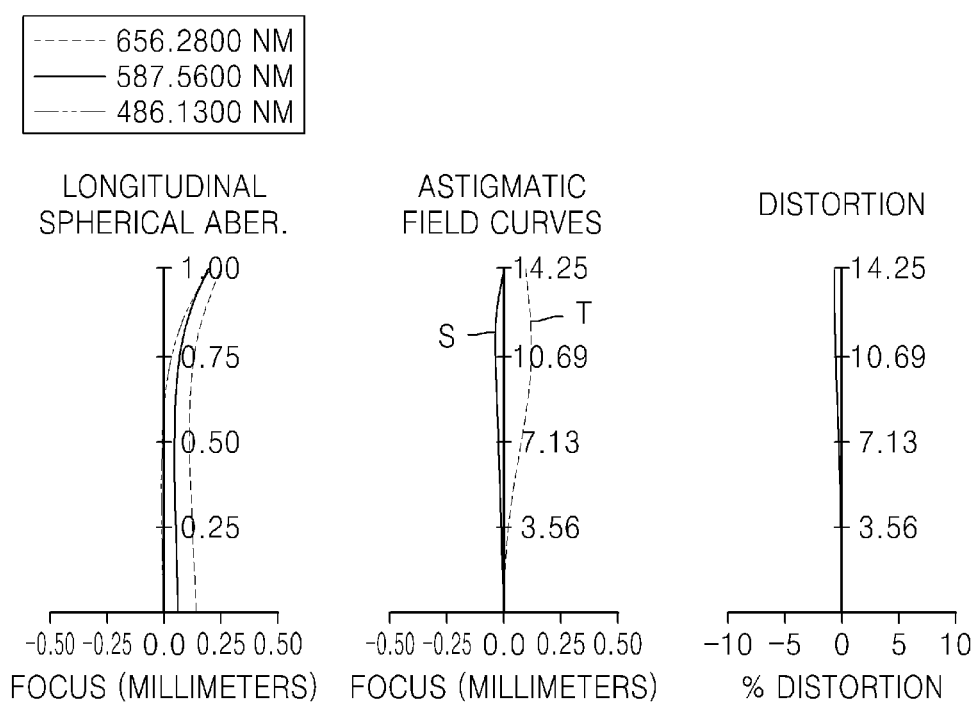
Figure 12C:
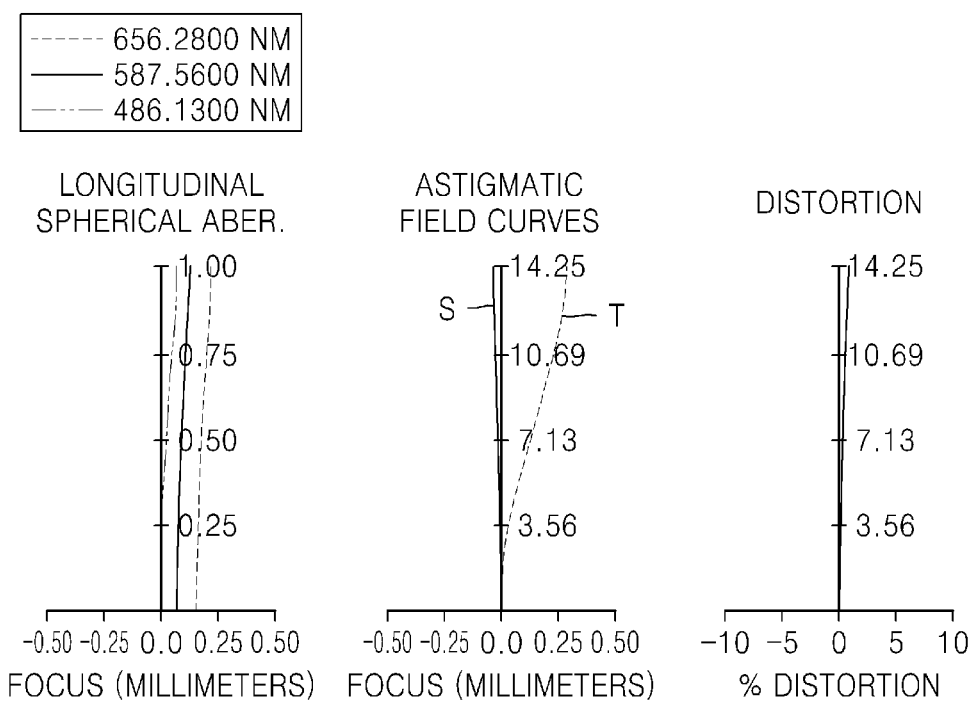

FIGS. 12A, 12B, and 12C each illustrate longitudinal spherical aberration, astigmatic field curves, and distortion of the zoom lens according to embodiment 6, at a wide angle position, at a middle position, and at a telephoto position.

Table 7 below shows that embodiments 1 through 6 satisfy the above-described conditions.

TABLE 7

|  | Condition (1) | Condition (2) | Condition (3) | Condition (4) |
|---|---|---|---|---|
| Embodiment 1 | 2.43 | 2.57 | 0.66 | 0.43 |
| Embodiment 2 | 2.30 | 2.51 | 0.63 | 0.43 |
| Embodiment 3 | 2.37 | 2.56 | 0.66 | 0.43 |
| Embodiment 4 | 2.39 | 2.56 | 0.66 | 0.44 |
| Embodiment 5 | 2.57 | 2.57 | 0.67 | 0.43 |
| Embodiment 6 | 2.58 | 2.60 | 0.70 | 0.41 |

According to the above-described embodiments, a wide-angle zoom lens having a compact structure due to the use of a small number of lenses while providing excellent optical performance, and having a viewing angle of 70° or greater at a wide angle position is provided.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A zoom lens comprising, in a sequence from an object side to an image plane side:
    a first lens group having a negative refractive power;
    a second lens group having a positive refractive power;
    a third lens group having a negative refractive power; and
    a fourth lens group having a positive refractive power,
    wherein:
    during zooming from a wide angle position to a telephoto position, an interval between the first lens group and the second lens group decreases, an interval between the second lens group and the third lens group increases, and an interval between the third lens group and the fourth lens group decreases;
    when the location of an object changes from ∞ to a close location, the first lens group is moved toward the object to perform focusing; and
    the zoom lens satisfies the following expression:

$$\frac{L_W}{\sqrt{f_W \cdot f_T}} \leq 3.0$$

where $L_W$, $f_W$, and $f_T$ denote an optical overall length at the wide angle position, an overall focal length at the wide angle position, and an overall focal length at the telephoto position, respectively.

2. The zoom lens of claim 1, wherein the zoom lens satisfies the following expression:

$$\frac{L_T}{\sqrt{f_W \cdot f_T}} \leq 3.0$$

where $L_T$, $f_W$, and $f_T$ denote an optical overall length at the telephoto position, the overall focal length at the wide angle position, and the overall focal length at the telephoto position, respectively.

3. The zoom lens of claim 1, wherein the zoom lens satisfies the following expression:

$$0.55 \leq \frac{f_{II}}{\sqrt{f_W \cdot f_T}} \leq 0.75$$

where $f_{II}$, $f_W$, and $f_T$ denote a focal length of the second lens group, the overall focal length at the wide angle position, and the overall focal length at the telephoto position, respectively.

4. The zoom lens of claim 1, wherein the zoom lens satisfies the following expression:

$$0.35 \leq \frac{m_{II(W)}}{m_{II(T)}} \leq 0.5$$

where $m_{II(W)}$ and $m_{II(T)}$ denote a paraxial lateral magnification of the second lens group at the wide angle position and a paraxial lateral magnification of the second lens group at the telephoto position, respectively.

5. The zoom lens of claim 1, wherein the second and fourth lens groups move in the same trajectory during zooming.

6. The zoom lens of claim 1, wherein the first lens group comprises, in a sequence from the object side:
   a negative meniscus lens that is convex toward the object;
   a negative biconcave lens; and
   a positive meniscus lens that is convex toward the object.

7. The zoom lens of claim 6, wherein the positive meniscus lens is formed of a material having a refractive index greater than 1.9.

8. The zoom lens of claim 1, wherein the second lens group comprises a doublet lens which is a combination of a positive lens and a negative lens.

9. The zoom lens of claim 1, wherein the third lens group comprises a single negative lens.

10. The zoom lens of claim 9, wherein the negative lens of the third lens group is formed of a material having an Abbe's number greater than 80.

11. The zoom lens of claim 1, wherein the fourth lens group comprises a single positive lens and a single negative lens.

12. The zoom lens of claim 10, wherein the positive lens of the fourth lens group comprises at least one aspherical surface.

\* \* \* \* \*